United States Patent Office 2,804,422
Patented Aug. 27, 1957

2,804,422

TRANQUILIZING COMPOSITION COMPRISING ALPHA PHENYL, ALPHA-(4-PIPERIDYL)-BENZYL ALCOHOL AND METHOD OF USING SAME

Edward L. Schumann, Cincinnati, Marcus G. Van Campen, Jr., Wyoming, and Raymond C. Pogge, Cincinnati, Ohio, assignors to The Wm. S. Merrell Company, Cincinnati, Ohio, a corporation of Delaware No Drawing. Application December 29, 1954, Serial No. 478,506

3 Claims. (Cl. 167—65)

This invention relates to a new chemical compound which is useful in the medical management of such psychotic and psychoneurotic conditions as hallucinations, delusions and psychotic and psychoneurotic over-activity, e. g., the improvement and suppression of symptoms of dementia praecox (schizophrenia), hallucinations of alcoholism, and the manic manifestations of manic depressive psychoses.

The new compound of the invention is alpha-phenyl, alpha-(4-piperidyl)-benzyl alcohol, which may also be termed alpha-(4-piperidyl)-benzhydrol, having the formula:

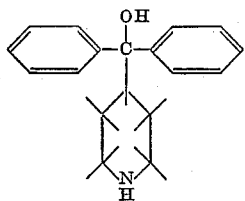

This new compound is conveniently prepared by reduction of alpha-(4-pyridyl)benzhydrol. Its preparation will be illustrated by the following examples:

Example I

A mixture of 26 gm. (0.1 mol.) of alpha-(4-pyridyl)-benzhydrol, 1.5 gm. of platinum oxide, and 250 ml. of glacial acetic acid is shaken at 50–60° under hydrogen at a pressure of 40–50 lbs./sq. in. The hydrogenation is complete in 2–3 hours. The solution is filtered and the filtrate evaporated under reduced pressure. The residue is dissolved in a mixture of equal parts of methanol and butanone and 0.1 mol. of conc. hydrochloric acid is added. The mixture is cooled and filtered to give about 30 gm. of alpha-(4-piperidyl)benzhydrol hydrochloride, M. P. 283–285°, as a white, crystalline substance.

Example II

A mixture of 21 gm. of alpha-(4-pyridyl)-benzhydrol hydrochloride, 250 ml. warm ethanol, and 1.5 gm. platinum oxide is shaken under hydrogen at a pressure of 40–50 lbs./sq. in. The hydrogenation is complete in about four hours. The mixture is warmed to dissolve any organic material, adding more alcohol if necessary. It is then filtered. The filtrate is diluted with ether, chilled and filtered. The desired hydrochloride is recrystallized by dissolving in warm alcohol, cooling, diluting with ether and filtering. The yield after such recrystallization is about 15 gm.

The free base is readily obtained from the hydrochloride salt by treatment with ammonia and when so obtained has a melting point of 160–161°. Treatment of this base with equivalent amounts of acids such as glycolic acid, lactic acid, etc., gives the corresponding salt, many of which have the advantage of having greater solubility in water than does the hydrochloride.

The new compound is basic, and will ordinarily be used in the form of an acid addition salt, i. e., as the hydrochloride, hydrobromide, sulfate, succinate, phosphate, glycolate, lactate, acetate, tartrate, levulinate, or the like. It can be adminstered orally, in the form of tablets or other suitable form, or by rectum as suppositories or other suitable form, or parenterally. The following examples illustrate suitable pharmaceutical compositions containing the new compound. In these examples the quantities are given for single units, it being understood that in actual practice, the dosage forms will be prepared in suitable quantities, and the amounts of materials used adjusted accordingly.

Example III

*0.25 mg. tablets.*—0.25 mg. of the hydrochloride of the new compound, 48 mg. of powdered sugar and 32 mg. of corn starch are mixed and granulated with 10% gelatin solution, prepared by dissolving 10 gm. of USP gelatin in enough hot water to make 100 cc. The granulation is dried and ground to fine granules suitable for tableting. About 0.5% calcium stearate is added as a lubricant together with sufficient corn starch to give a weight of 1.3 grains per tablet. The tablets are formed on the single punch machine or rotary machine using a 7/32 inch punch.

Example IV

*400 mg. tablets.*—400 mg. of the hydrochloride of the new compound in finely powdered form is admixed with 60 mg. of corn starch and granulated with 10% gelatin solution. The granulation is dried and ground to a size suitable for tableting. About 1% calcium stearate is added as a lubricant together with sufficient corn starch to give a weight of 480 mg. per tablet. The product is compressed on a single punch or rotary machine using a 7/16 inch punch.

The tablets of Examples III and IV may be suitably coated if desired, as, for example, with sugar.

Example V

*Liquid (syrup) 0.25 mg. per teaspoon.*—0.25 mg. of the hydrochloride of the new compound is dissolved in one ml. of water. 5 mg. of sodium benzoate, 3.5 ml. of liquid sugar, 5 mg. of citric acid and 0.375 mg. of butoben are added and stirred until dissolved, using gentle heat if necessary. Flavor as desired and water qs. 5 ml. are then added.

Example VI

*Liquid (syrup) 400 mg. per teaspoon.*—400 mg. of the glycolate of the new compound and 1.5 gm. of sugar are dissolved in sufficient water so that after the addition of 0.75 ml. of alcohol USP and flavor as desired, the volume is 5 ml.

Example VII

*Capsule.*—0.25 mg. of the hydrochloride of the new compound is intimately admixed with corn starch in quantity required to provide sufficient bulk for the desired size capsule, and the mixture is encapsulated.

Example VIII

*Capsule.*—400 mg. of the hydrochloride of the new compound is admixed with sufficient corn starch to give the proper bulk for a number 0 capsule, and the mixture is encapsulated.

Example IX

*Injectable solution, 0.25 mg. per ml.*—9 mg. of sodium chloride A. R.–ACS are dissolved in 0.8 ml. of water for injection USP. 0.25 mg. of the hydrochloride of the new compound are dissolved in this solution and water for injection qs. one ml. is added and mixed thoroughly. The solution is filtered through the sintered glass, filled into sterile one ml. ampuls, and sterilized in the autoclave at 250° F. for 30 minutes.

Example X

*Injectable solution, 400 mg. per 5 ml.*—400 mg. of the glycolate of the new compound is dissolved in 4.5 ml. of water for injection USP after which the volume is adjusted to 5 ml. by the addition of water for injection. The solution is thoroughly mixed, filtered through fine sintered glass, filled into sterile 5 ml. ampuls and sterilized in the autoclave at 250° F. for 30 minutes.

Example XI

*Oral suspension.*—150 mg. of Veegum H. V. is hydrated in about 3 ml. of water. 250 mg. of Tween 80, 0.25 mg. of the hydrochloride of the new compound, color and flavor as desired and water qs. 5 ml. are added, the product is mixed well and homogenized.

Example XII

*Oral suspension, 400 mg. per 5 ml.*—50 mg. of Veegum H. V. are hydrated in about 3 ml. of water, 250 mg. of Tween 80, 400 mg. of the hydrochloride of the new compound, color and flavor as desired and water qs. 5 ml. are added, the product is mixed well and homogenized.

The suppression or improvement of the symptoms of dementia praecox, hallucinations of alcoholism, and the manic manifestations of manic depressive psychoses has been observed in a number of individuals at dosage levels ranging from 10 mg. to 50 mg. per day. At present, we believe that a dosage schedule of 10 mg. per day is probably insufficient and that a dosage level of 20 to 300 mg. per day, orally, is indicated. We have observed rapid reversal of schizophrenic-like phenomena induced by LSD-25 on intravenous administration of the compound of the invention. We believe that the new compound operates to improve or suppress the symptoms of the indicated affliction, and, therefore, believe that continued use is necessary. In any event, we have observed suppression of such symptoms in patients taking the drug, followed by return of the symptoms when the drug was no longer taken, followed by suppression of the symptoms again upon return to the use of the new compound. The new compound has been administered to some people with schizophrenic symptoms and has been found ineffective. We do not know whether this is because the new compound is effective only with certain patients or whether the dosage level (20 mg. per day) in those particular cases was insufficient.

This application is a continuation-in-part of application Serial No. 417,956 filed March 22, 1954, now abandoned.

We claim:

1. A method useful in the medical management of hyperactive patients subject to psychotic and psychoneurotic conditions which comprises administering alpha-phenyl, alpha-(4-piperidyl)-benzyl alcohol to the patients.

2. A pharmaceutical preparation in dosage unit form adapted for the treatment of hyperactive psychotic and similar psychoneurotic conditions, comprising a solid pharmaceutical carrier and from about 0.25 mg. to about 400 mg. per dosage unit of alpha-phenyl, alpha-(4-piperidyl)-benzyl alcohol.

3. A pharmaceutical preparation in dosage unit form adapted for the treatment of hyperactive psychotic and similar psychoneurotic conditions, comprising sterile water as the carrier and containing at least 0.25 mg. per ml. of a pharmaceutically acceptable acid addition salt of alpha-phenyl, alpha-(4-piperidyl)-benzyl alcohol.

References Cited in the file of this patent

UNITED STATES PATENTS

| | | |
|---|---|---|
| 2,507,468 | Goggin | May 9, 1950 |
| 2,624,739 | Werner | Jan. 6, 1953 |
| 2,682,543 | Adamson | June 29, 1954 |

FOREIGN PATENTS

| | | |
|---|---|---|
| 507,597 | Belgium | Dec. 31, 1951 |

OTHER REFERENCES

Sugimoto et al., Jour. Pharm, Soc. of Japan, vol. 73, pp. 66–71, abstracted in Chem. Abst., vol. 47, col. 10532 (g) 1953.